United States Patent [19]

Lassche

[11] 4,126,919
[45] Nov. 28, 1978

[54] COUPLING APPARATUS

[76] Inventor: Jakob Lassche, Nr. 255, Weerseloseweg, Enschede, Netherlands

[21] Appl. No.: 395,905

[22] Filed: Sep. 10, 1973

[30] Foreign Application Priority Data

Sep. 11, 1972 [NL] Netherlands .................. 7212304

[51] Int. Cl.² .......................................... A44B 11/25
[52] U.S. Cl. ............................................... 24/230 A
[58] Field of Search .......... 24/230 R, 230 A, 230 AV

[56] References Cited

U.S. PATENT DOCUMENTS 3,237,265  3/1966  Florian ............................ 24/230 A
3,238,587  3/1966  Goinard ........................... 24/230 A

FOREIGN PATENT DOCUMENTS 1,315,413  12/1962  France ............................. 24/230 A
1,317,765  1/1963   France ............................. 24/230 A Primary Examiner—Kenneth J. Dorner
Attorney, Agent, or Firm—John P. Snyder

[57] ABSTRACT

A coupling device opening a predetermined time after a tractive force exerted thereon exceeds a predetermined limit, said predetermined time starting again if a said limit exceeding tractive force is exerted again before the coupling device is opened. The time being controlled by a mechanical time delay mechanism.

9 Claims, 13 Drawing Figures

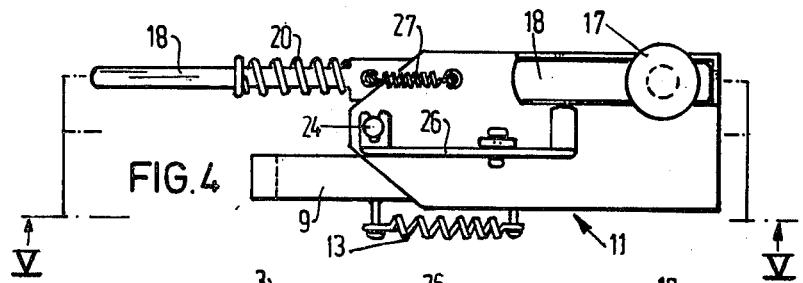
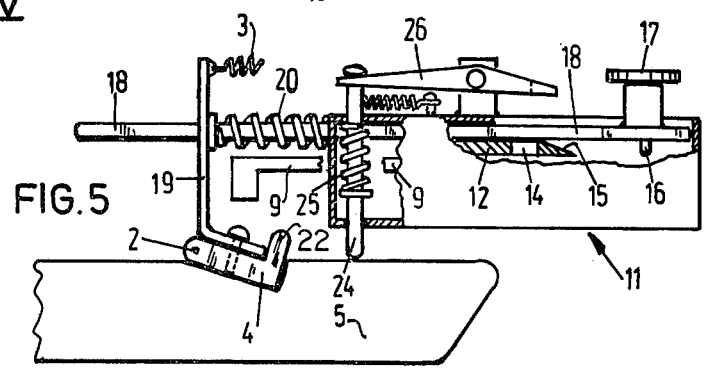
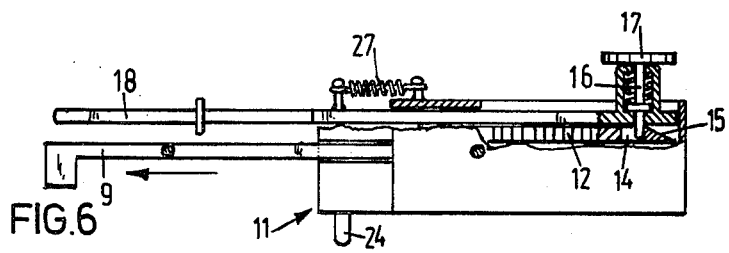
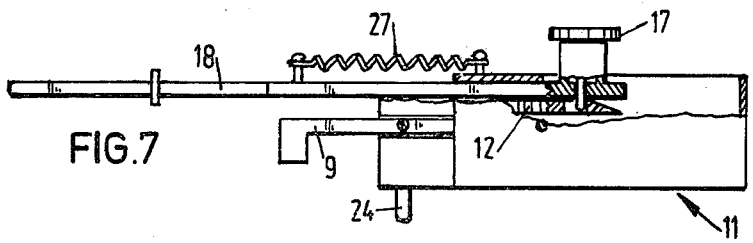
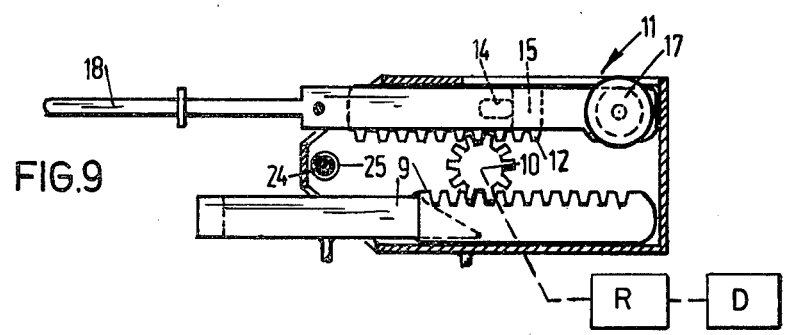

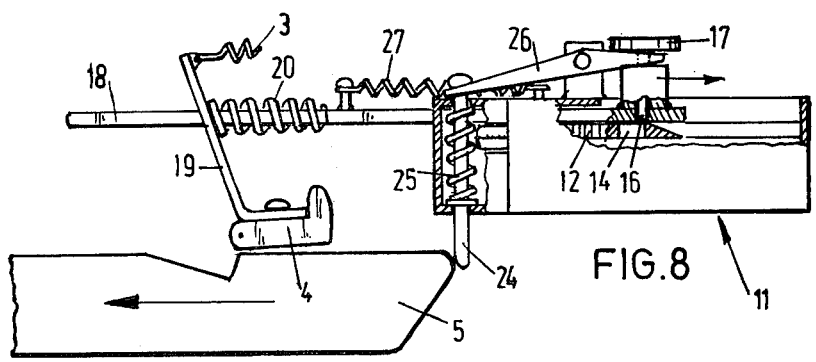
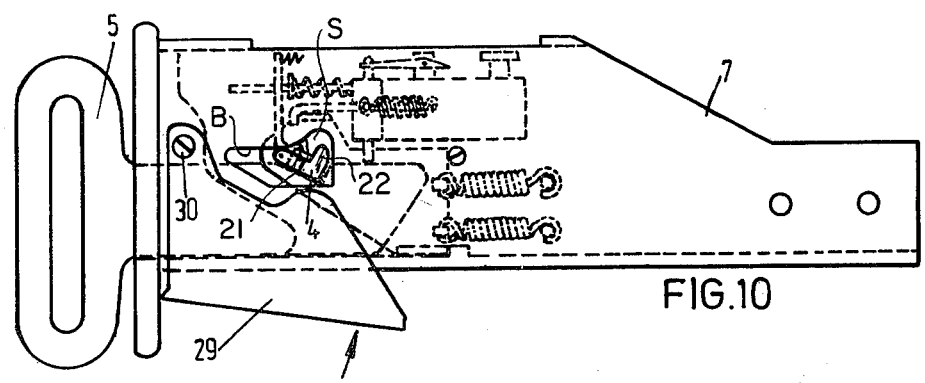
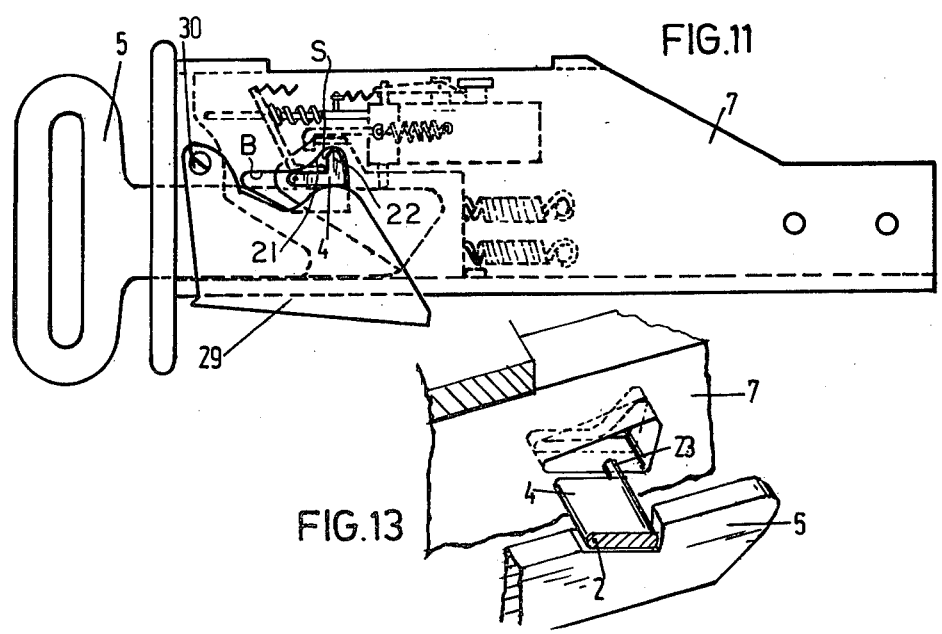

COUPLING APPARATUS

The invention relates to a coupling device which opens some time after a tractive force exerted thereon has exceeded a predetermined limit.

Various embodiments of coupling devices of the kind set forth are known for use in safety belts, but they involve various disadvantages:
mechanical unreliability,
great variation of the lapse of time between the instant at which the tractive force exceeds the predetermined limit and the instant of opening, and
a release of the coupling device whilst the likelihood of further heavy shicks of the kind occurring in chain collisions is still existing.

The invention has for its object to prevent and avoid said and other disadvantages to be set out hereinafter and to provide a similar coupling device characterized by:
a housing accommodating a movable, spring-loaded lock bolt and a tongue having at least one recess and being fixable in said housing by means of said lock bolt,
a traction member adapted to move against the action of at least one spring with respect to said housing under the influence of a tractive force exceeding a predetermined value, and
an unlocking member connected both with the housing and the traction member and comprising a driving spring which is tensioned by the relative movement of the housing and the traction member and which is capable of relieving whilst displacing an outlet member, being then retarded by a mechanical time-delay mechanism, said outlet member lifting the lock bolt from the recess in the tongue during its displacement.

The use of a mechanical time-delay member of the kind employed, for example, in a clock or a self-timer has the advantage that said time lapse is constant and reproducible.

Since the unlocking member is untensioned in the condition of rest and is tensioned not until a given tractive force is produced, there is no risk of reduction of force and the coupling device is only opened after the predetermined time lapse has terminated without further heavy tractive forces, the unlocking member being tensioned again each time when an excessive tractive force occurs and said lapse of time has to start again.

Said advantages cannot be obtained by means of hydraulic time-delay devices, since their operation strongly depends upon temperature, neither by means of coupling devices under tension in the condition of rest, since the occurrence of the excessive tractive force initiates the release and cannot start a recurrence.

The invention will be described more fully with reference to the accompanying drawings of a few preferred embodiments of coupling devices suitable for use as locks of safety belts.

FIG. 4 is a plan view of the unlocking member.

FIGS. 5 to 8 are longitudinal sectional views taken on the line V—V in FIG. 4 in two stages of operation.

FIG. 9 is a developed plan view of the unlocking member shown in FIG. 4.

FIGS. 10 and 11 are cut away views of the coupling device in a modified embodiment.

FIG. 13 is an exploded view of a detail of a further embodiment.

Although the coupling device may be employed on a wider field, for example, in a hoisting strap, it will be described hereinafter as a coupling device for use in a safety belt of the kind used in vehicles and aircraft.

Figure 1:
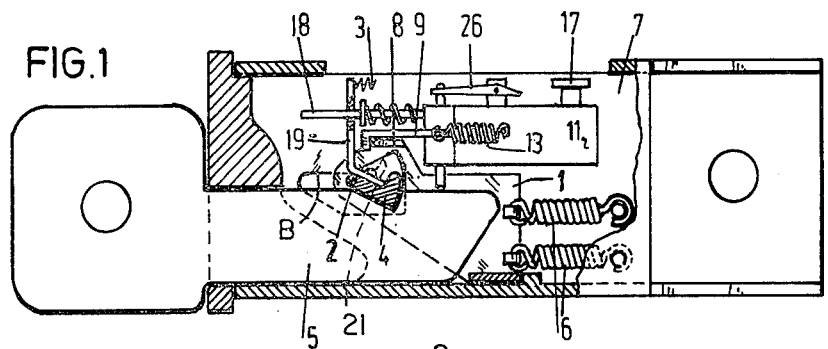
FIGS. 1, 2 and 3 are schematic sectional views of a coupling device in accordance with the invention in successive stages of operation.
Figure 2:
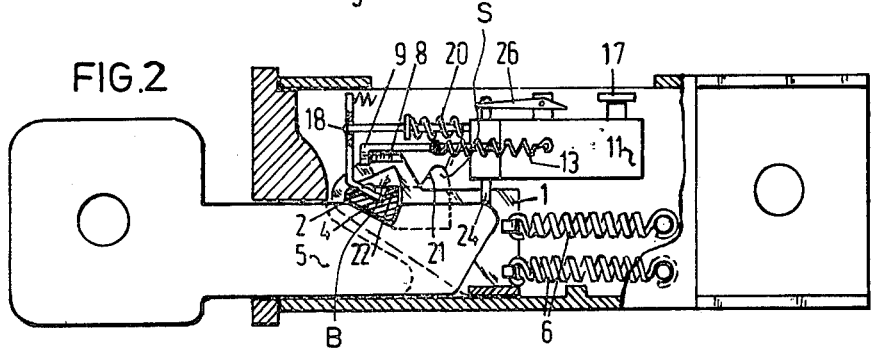
Figure 3:
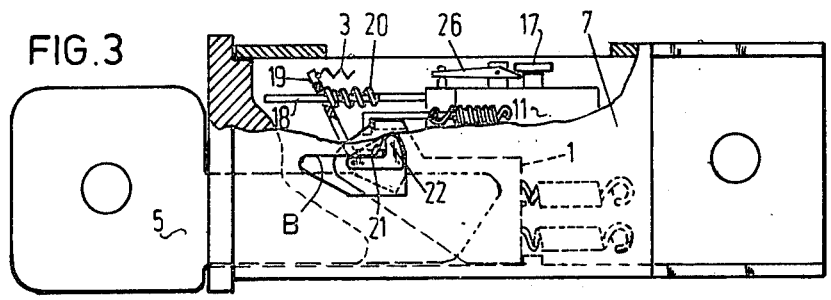

The coupling device embodying the invention shown in FIGS. 1 to 3 comprises a housing 1 accommodating a lock bolt 4 loaded by a spring 3 and adapted to turn about an axis 2. By the lower edge this lock bolt fits in a recess in a tongue 5 inserted into the housing. The housing 1 is arranged in a traction member 7 embracing the frame and is relatively movable thereto against the action of tensile springs 6. When a tractive force exceeding a given threshold value adjustable by means of the springs 6 is exerted on the one hand on the tongue 5 and on the other hand on the traction member 7, the housing shifts in place with respect to the traction member as is illustrated in FIG. 2.

At this displacement an extension 8 of the housing 1 (see FIG. 2) carries along a hook-like extension of a toothed rack 9, which engages a toothed wheel 10 of an unlocking member 11, which is fastened in the traction member.

As shown in FIG. 9, the toothed wheel 10 is by a ratchet wheel mechanism R coupled with a time-delay member or motion retarding means D which retards the toothed wheel in a rotation in the reverse direction and with a second toothed rack 12. One of the two racks, in this Figure the first rack 9, is connected with a tensile spring 13, which is also connected with the casing of the unlocking member 11 and tends to hold the racks in the starting position. From FIG. 5 it will be apparent that the second toothed rack 12 is provided near one end i.e. the front end at the initial movement, with an opening 14 at said end with a bevelled part 15, lifting at the end of its movement a spring-loaded pawl 16 provided with a knob 17 on the outlet member 18 of the unlocking member 11 so that the pawl can snap into the opening 14 (see FIG. 6). Then the second rack is coupled with the outlet member 18. During the return movement, after the tractive force is eliminated, the second rack 12 carries along the outlet member (see FIG. 7) under the action of the tensioned spring 13. This return movement is retarded by the time-delay member D with which the toothed wheel 10 is now connected by the ratchet-wheel mechanism R. The members 12 and 18 together with the return spring 27, the gear 10 and its associated ratchet-wheel mechanism R and time-delay member D, the member 9 and its return spring 13 constitute a time delay means which is actuated by the latch 16 only in response to withdrawal movement of the housing 1 to that predetermined position at which the rack member 9, through the gear 10, has moved the rack member 12 far enough to allow the latch 16 to couple the two members 12 and 18 together for time-delayed return motion under the action of the return springs 13 and 27.

At the end of its movement the outlet member 18 engages an arm 19 associated with the lock bolt so that the bolt 4 turns about the axis 2 and is lifted out of the recess of the tongue (see FIGS. 3 and 8).

Between the outlet member 18 and the arm 19 is arranged a compression spring 20, which can be compressed when the lock bolt 4 and hence the arm 19 are blocked, and which lifts the lock bolt 4 out of the recess as soon as the blocked state is obviated. Blocking occurs, for example, when the safety belt comprising the coupling device remains under tension, for example, when an unconscious person is hanging in the belt. When said person is lifted, the tension of the belt disappears and hence also the blocking state so that the coupling device immediately opens.

If a second collision should occur at the instant when the lock bolt 4 is almost lifted out of the recess of the tongue 5, heavy forces would be exerted on a very small contact surface so that a great risk of damage of tongue and lock bolt is involved and the coupling device becomes unreliable.

The coupling device according to the invention is preferably provided with a wedge-shaped compulsion member 21 connected with the traction member 7, together with which it moves with respect to the lock bolt 4 during a collision. The wedge-shaped surface thereof urges downwards an extension 22 connected with the lock bolt so that the bolt is again pushed completely home in the recess of the tongue 5 before the full tractive force is exerted on the coupling device. Moreover, since the bolt 4 is locked in place by the compulsion member during the collision, the coupling cannot possibly be broken up.

That is to say, from an initial locked position as shown in FIGS. 1 and 10, if an occupant is thrown forwardly with sufficient force, the belt will be tensioned to overcome the springs 6 and the parts will then be in the position of FIG. 2. At this time, the locking bolt 4 is positively constrained to remain in locking engagement with the tongue 5 because the extension 22 of the locking bolt 4 has moved beneath the blocking surface B of the compulsion arrangement. Also, the member 9 (FIG. 9) has been withdrawn sufficiently so that the pinion 10 has shifted the rack 12 fully to the right (see FIG. 6) whereby the ramp 15 has ridden the pin 16 upwardly until it has snapped into the opening 14. Now when the tension has relaxed, the parts return to the initial position of FIG. 1. However, the time delay action has now been initiated because the rack 12 is now coupled to the member 18 and the elements 18 and 9 are in the position shown in FIG. 6. As the time delay slowly allows the pinion 10 to turn the member 9 returns to the right while member 18 moves to the left to tension the spring 27, these parts ultimately reaching the end position shown in FIG. 7. During this time, if there is no tension on the belt, the locking bolt will swing slowly about its pivot 2 because the extension is free to swing upwardly in the space S. Thus, if there is no tension on the belt by the end of the time delay, the tongue 5 is free for withdrawal. However, if the occupant is thrown forwardly a subsequent time prior to expiration of the delay time (i.e., the locking bolt 4 is not fully clear from the tongue) then the extension 22 will engage the cam surface 21 and force the locking bolt 4 fully into engagement with the tongue. This is the compulsion effect and it is important to note that in the process the delay action will be reset to begin again.

Once the delay time has cycled out and there is no tension on the belt, the locking bolt 4 will be fully clear from the tongue and the tongue may be withdrawn. When this happens, as shown in FIG. 8, the pin 24 is allowed to drop off the end of the tongue whereby the member 26 lifts the button 17 and allows the spring 27 to move the member 18 back to its initial position. If, during and after the delay time, there is tension on the belt, the bolt 4 will be jammed against the tongue and cannot fully retract. Thus, the spring 20 is partially compressed so that when the tension is released, the spring 20 will snap the locking bolt 4 out of engagement with the tongue.

In the embodiments shown in FIGS. 1–12 the compulsion member 21 is formed by providing in the traction member an L-shaped opening, the limbs of the L including a partially bevelled side which forms the wedge-shaped compulsion member. On this bevel side bears the end of the short limb 22 of the lock bolt 4, when the latter leaves the recess.

FIG. 13 is a perspective exploded view of a detail of a modified embodiment of the compulsion member. The extension on the lock bolt is formed by a pin 23 arranged at the turning end of the bolt 4 in the direction of length thereof and projecting into an L-shaped opening of the housing, the opening having an inclined side between the limbs.

Hereinafter the various stages of operation of the coupling device will be set out.

FIG. 1 shows the coupling device in the closed state. The lock bolt 4 is located in the recess of the tongue 5.

FIG. 2 shows the state during a collision: the traction member 7 with the associated compulsion member 21 is drawn to the right with respect to the housing 1 with the lock bolt 4 and the tongue 5. If the lock bolt 4 were not completely held in the recess, the inclined side of the compulsion member would have urged down the extension 22 on the lock bolt. The springs 6 are tensioned and the rack 9 with the hook is drawn out by the extension 8 on the housing.

FIG. 3 illustrates the state in which the unlocking member has lifted the lock bolt out of the recess and the tongue 5 can be removed from the coupling device.

FIGS. 4, 5 and 6 show the unlocking member in the rest position i.e. FIG. 6 at the instant indicated in FIG. 2 and FIG. 7 at the instant indicated in FIG. 3 and FIG. 8 at the removal of the tongue 5.

At the removal of the tongue 5 a spring-loaded pin 24 serving as a feeler 24 can move downwards under the action of the spring 25, whilst moving along the arm of a lever 26. The other arm of said lever is located beneath the knob 17 of the coupling and lifts the same so that the pawl 16 is lifted out of the opening 14 and the outlet member 18 is moved by the tensioned tensile spring 27 back into the initial position.

Figure 12:
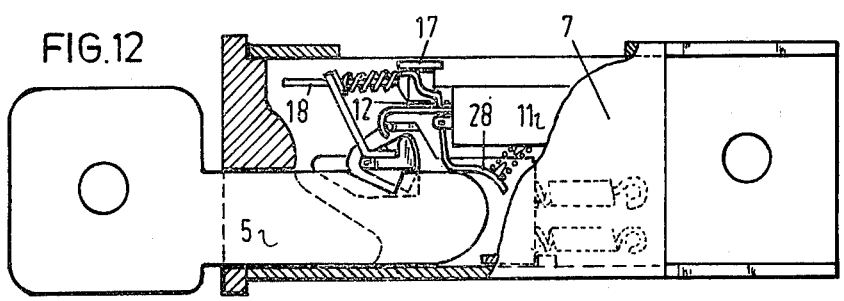
FIG. 12 is a sectional view of a further embodiment.

A different embodiment of this resetting mechanism is shown in FIG. 12. The coupling is located at the other end of the rack 12 and the knob 17 thereof is lifted at the removal of the tongue 5 by the spring-loaded lever 28 so that the coupling between the outlet member 18 and the outlet rack 12 is interrupted.

FIGS. 10 and 11 show an embodiment of the coupling device comprising a control-knob 29, for lifting the lock bolt 4 out of the recess of the tongue 5 so that this embodiment may, in addition, be employed as a lock for a safety belt. FIG. 10 shows the coupling device in the closed state and FIG. 11 shows the same in the open state. In the state shown in FIG. 11 a force is exerted on the knob 29 in the direction of the arrow so that it turns about the fulcrum 30 and lifts the lock bolt 4. It will be seen that the compulsion member prevents this as long as heavy tractive forces are prevailing in the belt.

What is claimed is:

1. An assembly for coupling a traction member to a second member and adapted to effect release therebetween in delayed response to tractive force exerted between said members which exceeds a predetermined limit, comprising in combination:

axially slidable coupling portions on said members, one of which is defined by an opening in said traction member and the other by a tongue forming part of said second member and inserted into said opening, said tongue having an abutment surface facing in the direction of axial withdrawal of said tongue from said opening;

a housing slidable with respect to said traction member back and forth along said direction of axial withdrawal, a lock bolt movably carried by said housing for movement into and out of engagement with said abutment surface and resilient means normally urging said lock bolt in a direction to engage said abutment surface, and spring means connecting said housing and said traction member for urging said housing in that direction opposite to said direction of axial withdrawal, said housing being guided within said traction member and said housing and traction member having mutually engageable stop portions whereby to allow movement of said housing only to a certain point in opposition to said spring means which corresponds to partial withdrawal of said tongue, and said spring means being of sufficient strength to prevent movement of the housing to said certain point unless a tractive force is exerted between said traction member and said second member which exceeds said predetermined limit;

time delay means carried by said traction member for moving said lock bolt out of engagement with said abutment surface only after a predetermined time delay after said housing has reached said certain point and has returned to its initial position; and means connected to said time delay means and moved by said housing member for actuating said time delay means only in response to movement of said housing at least substantially to said certain point, whereby initiation of automatic release action cannot be effected except in response to tractive forces exceeding said predetermined limit, said time delay means including a first member shifted in one direction in response to movement of said housing in the withdrawal direction and return spring means opposing such shifting of the first member to urge it in return direction opposite said one direction, motion-retarding means engaging said first member for slowing its return motion as effected by said return spring means, and a second member adapted to participate in return motion of said first member ultimately to engage and release said lock bolt, said means for actuating said time delay means comprising latch means for connecting said first and second members when said housing is substantially at said certain point.

2. An assembly as defined in claim 1 wherein said means connected to said time delay means also includes a rack member engaged by said housing for positive displacement therewith only in said withdrawal direction, said rack member being connected to said first member such that they participate in relatively opposite motions.

3. An assembly as defined in claim 2 wherein said first member is in the form of a rack and including a pinion interconnecting said first member and said rack member, said motion-retarding means being connected to said pinion.

4. An assembly as defined in claim 2 including compulsion means for constraining said lock bolt to engage fully with said abutment surface in any partially withdrawn position of said tongue except those positions in which it is substantially fully inserted.

5. An assembly as defined in claim 4 wherein said compulsion means comprises cooperating cam surfaces on said traction member and said lock bolt.

6. An assembly as defined in claim 1 including compulsion means for constraining said lock bolt to engage fully with said abutment surface in any partially withdrawn position of said tongue except those positions in which it is substantially fully inserted.

7. An assembly as defined in claim 6 wherein said compulsion means comprises cooperating cam surfaces on said traction member and said lock bolt.

8. An assembly as defined in claim 1 including means for releasing said latch means in response to withdrawal movement of said tongue relative to said housing.

9. An assembly for coupling a traction member to a second member and adapted to effect release therebetween in delayed response to tractive force exerted between said members which exceeds a predetermined limit, comprising in combination:

axially slidable coupling portions on said members, one of which is defined by an opening in said traction member and the other by a torque forming part of said second member and inserted into said opening, said tongue having an abutment surface facing in the direction of axial withdrawal of said tongue from said opening;

a housing slidable with respect to said traction member back and forth along said direction of axial withdrawal, a lock bolt movably carried by said housing for movement into and out of engagement with said abutment surface and resilient means normally urging said lock bolt in a direction to engage said abutment surface, and spring means connecting said housing and said traction member for urging said housing in that direction opposite to said direction of axial withdrawal, said housing being guided within said traction member and said housing and traction member having mutually engageable stop portions whereby to allow movement of said housing only to a certain point in opposition to said spring means which corresponds to partial withdrawal of said tongue, and said spring means being of sufficient strength to prevent movement of the housing to said certain point unless a tractive force is exerted between said traction member and said second member which exceeds said predetermined limit;

time delay means carried by said traction member for moving said lock bolt out of engagement with said abutment surface only after a predetermined time delay after said housing has reached said certain point and has returned to its initial position;

means connected to said time delay means and moved by said housing member for actuating said time delay means only in response to movement of said housing at least substantially to said certain point, whereby initiation of automatic release action cannot be effected except in response to tractive forces exceeding said predetermined limit; and compulsion means for constraining said lock bolt to engage fully with said abutment surface in any partially withdrawn position of said tongue except those positions in which it is substantially fully inserted, said compulsion means comprises cooperating cam surfaces on said traction member and said lock bolt.

* * * * *